United States Patent [19]
White

[11] Patent Number: 5,131,014
[45] Date of Patent: Jul. 14, 1992

[54] APPARATUS AND METHOD FOR RECOVERY OF MULTIPHASE MODULATED DATA

[75] Inventor: Charles M. White, Indianapolis, Ind.

[73] Assignee: General Instrument Corporation, Hatboro, Pa.

[21] Appl. No.: 688,966

[22] Filed: Apr. 19, 1991

[51] Int. Cl.⁵ .................................................. H03D 3/24
[52] U.S. Cl. ..................................... 375/119; 375/81; 329/304
[58] Field of Search ................ 375/80, 83, 84, 85, 375/86, 119, 120, 81, 106; 329/304, 307, 310; 331/17, 25; 370/105.5, 108

[56] References Cited

U.S. PATENT DOCUMENTS

| | | | |
|---|---|---|---|
| 4,010,323 | 3/1977 | Peck | 375/84 |
| 4,651,108 | 3/1987 | Okita et al. | 375/85 |
| 4,821,097 | 4/1989 | Robbins | 358/143 |
| 4,876,699 | 10/1989 | Nelson | 375/119 |
| 4,942,591 | 7/1990 | Nease et al. | 375/84 |
| 4,979,230 | 12/1990 | Marz | 455/3 |

*Primary Examiner*—Stephen Chin
*Attorney, Agent, or Firm*—Barry R. Lipsitz

[57] ABSTRACT

A method and apparatus are provided for recovering multiphase modulated data. A signal pulse of a fixed duration is generated upon the transition of a first phase component of a multiphase modulated signal transmitted at a fixed bit rate. A data clock signal having a frequency in synchronism with the bit rate is generated in response to an error signal. The data clock signal is delayed by a delay of approximately one half the duration of the signal pulse. The delayed clock is gated using the signal pulse to provide the error signal that establishes the data clock frequency. Components of the multiphase signal are sampled using the phase locked data clock to recover data.

20 Claims, 3 Drawing Sheets

APPARATUS AND METHOD FOR RECOVERY OF MULTIPHASE MODULATED DATA

BACKGROUND OF THE INVENTION

The present invention relates to the recovery of multiphase modulated digital data, and more particularly to a method and apparatus for recovering high quality digital audio signals transmitted via a cable television system or over the airwaves.

New digital techniques for the reproduction of sound provide performance that is far superior to analog techniques which have been used in the past. An example of high fidelity sound reproduction using digital techniques can be found in the compact disc technology that has enjoyed tremendous success as an alternative to phonograph records and tapes. Digital recording and playback techniques provide reproduction of music that is extremely realistic and absent from background noise and distortions which have plagued other high fidelity sound reproduction systems in wide scale use.

Cable television ("CATV") networks have provided one medium for the transmission of digital audio programs. Cable television growth has come from the development of various programming categories and by the technologies which have made program delivery possible. Cable first brought distant television signals to areas where there was little or no off-air reception. This applies to distant signals and weak signal areas where outdoor antennas were previously mandatory. The next category to bring major growth to cable was pay service after the development of reasonable cost satellite delivery systems. After satellite delivery was accepted and less costly, super stations and cable networks formed another category of programming that has become customary, providing "extended basic" services. Franchising and local politics have created a generally unprofitable but necessary category called "local origination". Recently, addressable technology and aggressive marketing have enabled "pay-per-view" programming to proliferate.

The provision of high quality audio services over cable is rapidly becoming available. In the past, the signal quality of analog audio transmission techniques has been poor and there has been no efficient way to collect revenue or control access to such services.

Digital techniques for the communication of high fidelity audio programs via a CATV network as well as via direct broadcast satellite and over the air enable the provision of high quality audio services on a subscription basis. Commonly owned U.S. patent application Ser. No. 07/280,770 filed Dec. 6, 1988 for "Apparatus and Method for Providing Digital Audio in the FM Broadcast Band", incorporated herein by reference, discloses a method and apparatus for providing high quality digital sound signals within the FM broadcast band. Commonly owned U.S. Pat. No. 4,821,097 to C. Robbins entitled "Apparatus and Method for Providing Digital Audio on the Sound Carrier of a Standard Television Signal", also incorporated herein by reference, discloses a system wherein the FM audio portion of a standard television signal is replaced with digital audio. In the techniques disclosed in these references, the digital audio information is carried using multiphase modulation.

A well known type of multiphase modulation is quadrature phase shift keyed ("QPSK") modulation. Advantages of QPSK modulation are discussed in C. Robbins, "Digital Audio for Cable Television", 1986 NCTA Technical Paoers, Dallas, TX, Mar. 15-18, 1986, pp. 21-24.

In receiving multiphase modulated data, it is important that the data be detected at a valid point in each phase component of the received signal. In a QPSK transmission, where an in-phase component I and an out-of-phase component Q (typically, 90 degrees out of phase with the I component) are present, the data is only valid in a center portion of the stable part of each of the I and Q data inputs. In a demodulator for any multiphase modulated data, whether it be audio data or other types of transmitted data, two requirements must be met, namely, (i) the detection of valid phase comparisons must be accomplished, and (ii) the effects of periods of no data transitions must be minimized.

It would be advantageous to provide a method and apparatus that maximizes the ability to detect valid phase comparisons while minimizing the potential for data recovery errors during periods where there are no data transitions in one or more phase components of a multiphase modulated signal. It would be particularly advantageous to provide such a method and apparatus that provide a clock recovery scheme wherein a data clock is phase locked to provide a clock transition exactly in the center of the stable part of each phase component data input. A method and apparatus providing such a clock recovery scheme could be used to sample the I and Q inputs of a QPSK modulated signal to produce clean and stable I and Q data.

The present invention provides a method and apparatus enjoying the above-mentioned advantages.

SUMMARY OF THE INVENTION

In accordance with the present invention, a clock circuit is provided for use in recovering data from stable center portions of multiphase modulated signal components. Means are provided for generating a signal pulse upon the transition of a first phase component of a multiphase modulated signal transmitted at a fixed bit rate. Oscillator means responsive to an error signal generate a data clock signal having a frequency in synchronism with said bit rate. The data clock signal is delayed by a fixed delay of approximately one half the duration of said signal pulse. Gate means, having an enable input coupled to receive the signal pulse and a data input coupled to receive the delayed clock, utilize the signal pulse to gate the delayed clock in order to provide an error signal. The error signal is coupled to the oscillator means to control the data clock frequency. Means responsive to the data clock are provided for sampling components of the multiphase signal to recover data therefrom.

The means for generating a signal pulse in the clock circuit can comprise an exclusive OR gate. The first phase component of the multiphase modulated signal is input to a first input of the exclusive OR gate. The first phase component is delayed by a predetermined duration and input to a second input of the exclusive OR gate. In this manner, the OR gate outputs a signal pulse having a duration determined by the amount by which the first phase component was delayed.

Each component of a multiphase modulated signal can be similarly processed. Thus, a plurality of exclusive OR gates can be provided, each having a first input coupled to receive a corresponding phase component of the multiphase modulated signal and a second input coupled to receive the corresponding phase component delayed by the desired duration. In such an embodiment, the gate means are responsive to a plurality of signal pulses from the exclusive OR gates for outputting and summing a corresponding plurality of gated delayed clock signals to provide said error signal. Lowpass filter means are coupled to an output of the gate means for filtering the summed plurality of gated delayed clock signals for input to error amplifier means. The error amplifier means amplify the filtered plurality of signals to provide the error signal.

In an illustrated embodiment, the gate means comprise tri-state gates, each having an enable input coupled to the output of one of the exclusive OR gates, and a data input coupled to receive the delayed clock signal. The duration of the signal pulse can be approximately one half of a bit time established by the fixed bit rate, in which case the fixed delay of the data clock will be approximately one quarter of said bit time. It should be appreciated that the objective of detecting data from the center of the stable part of each phase component is achieved by the requirement that the data clock signal be delayed by approximately one half the duration of the signal pulse. Although convenient, it is not critical that the duration of the signal pulse be one half of a bit time, as long as the relationship between the signal pulse duration and data clock delay is maintained.

In a method in accordance with the present invention, a signal pulse of fixed duration is generated upon the transition of a first phase component of a multiphase modulated signal transmitted at a fixed bit rate. A data clock signal is generated in response to an error signal, and has a frequency in synchronism with the bit rate. The data clock signal is delayed by a delay of approximately one half the duration of the signal pulse. The delayed clock is gated by the signal pulse to provide the error signal. Components of the multiphase signal are sampled using the data clock to recover data therefrom.

In order to generate the signal pulse, the first phase component can be delayed by a time period equal to the fixed duration, and exclusive ORed with the nondelayed first phase component. All of the phase components of the multiphase signal can be concurrently processed by providing a plurality of exclusive OR gates to provide a plurality of signal pulses. An error derivation signal is generated corresponding to each signal pulse by gating the delayed clock in response to each signal pulse. The error derivation signals are then processed to provide the error signal. Processing of the error derivation signals to provide the error signal can comprise the steps of summing, low-pass filtering, and amplifying the error derivation signals. In an illustrated embodiment, the fixed duration of the signal pulse is approximately equal to one half of a bit time established by the fixed bit rate.

A specific QPSK data demodulator embodiment is also disclosed. Means are provided for receiving a QPSK modulated data signal. An I component of the QPSK signal is input to a first input of a first exclusive OR gate. The I component is delayed by a first time period and input to a second input of the first exclusive OR gate. A Q component of the QPSK signal is input to a first input of a second exclusive OR gate. The Q component is delayed by said first time period and input to a second input of the second exclusive OR gate. First gate means, responsive to an output from the first exclusive OR gate, gate a clock signal delayed by a time period of approximately one half of the first time period. Second gate means, responsive to an output from the second exclusive OR gate, also gate the delayed clock signal. Means are coupled to the first and second gate means for processing the gated delayed clock signals to provide an error signal. Oscillator means responsive to the error signal generate the clock signal. Means responsive to the clock signal sample the I and Q components to recover data carried thereby. The first time period, which establishes the delay of each of the I and Q components before they are input to their respective OR gates, can be equal to the amount by which the I and Q components are offset from each other in the received QPSK signal. In an illustrated embodiment, the first and second gate means comprise tri-state gates.

In a broader embodiment of the present invention, a demodulator is provided for use in recovering data from a plurality of phase components of a multiphase modulated signal. The demodulator comprises means for delaying a clock signal produced by a voltage controlled oscillator. Means are also provided for detecting signal transitions in a plurality of phase components of a multiphase modulated signal and generating corresponding transition detect pulses. Means responsive to the transition detect pulses gate the delayed data clock signal to produce a plurality of waveforms corresponding to the phase components. Each waveform has an average value dependent on a time relationship between the delayed data clock signal and the duration of the transition detect pulses. The waveforms are summed to produce an error signal. Means responsive to the error signal control the frequency of the voltage controlled oscillator. Means responsive to the data clock signal produced by the voltage controlled oscillator sample the phase components to recover data therefrom. In order to sample data at the center of a stable part of each phase component, the data clock signal is delayed by approximately one half the duration of the transition detect pulses. The gating means can comprise a tri-state gate for each phase component, each having an enable input coupled to receive the transition detect pulses for the corresponding phase component and a data input coupled to receive the delayed data clock signal.

DESCRIPTION OF THE INVENTION

DETAILED

Figure 1:
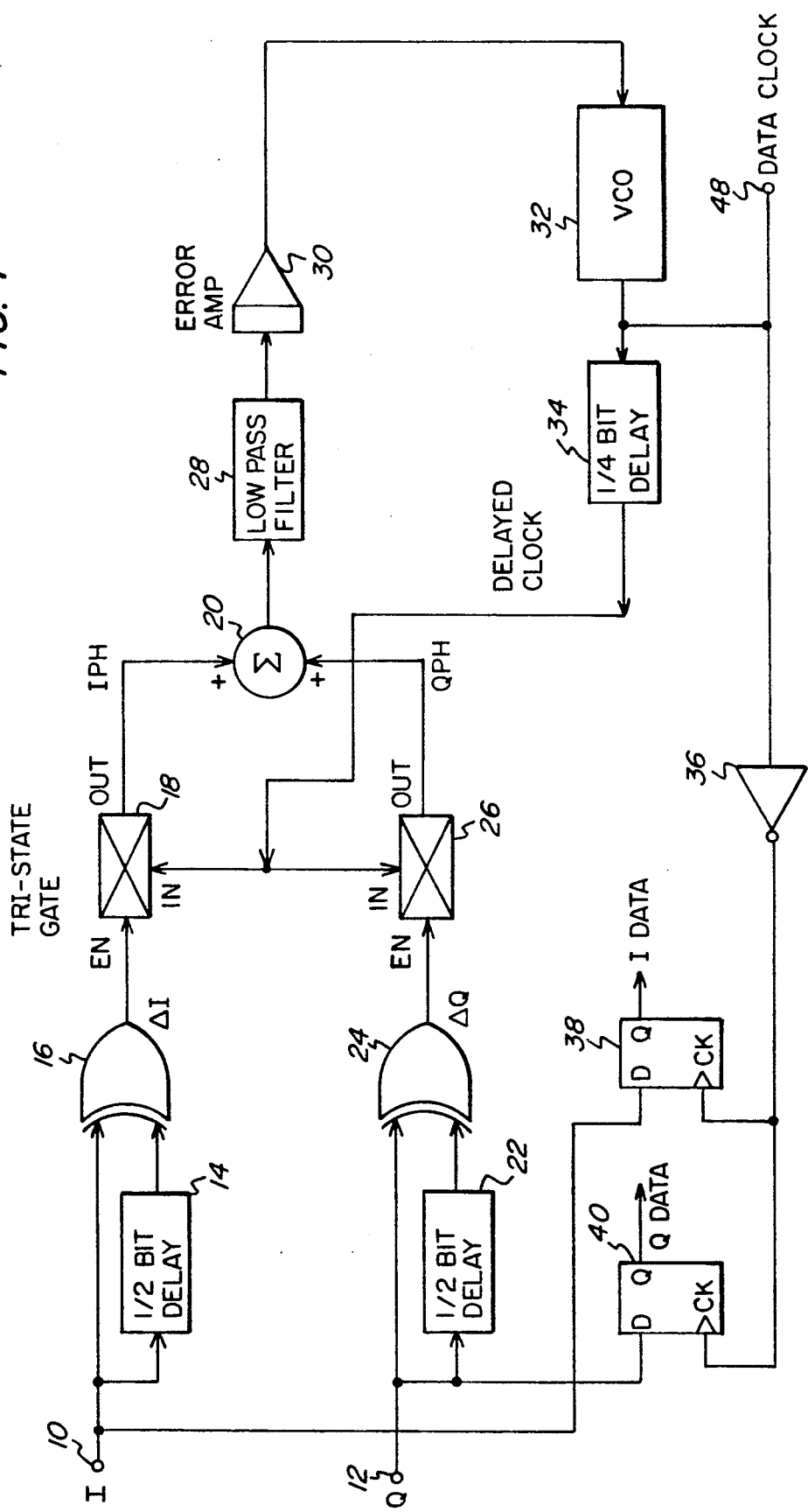
FIG. 1 is a block diagram of a data clock recovery circuit in accordance with the present invention.

A block diagram of a data clock recovery circuit in accordance with the present invention is provided in FIG. 1. The circuit operates in accordance with the timing diagram of FIG. 3. Although the circuit has specific application to the recovery of QPSK modulated data, those skilled in the art will appreciate that an equivalent circuit can be used to recover data from any multiphase modulated signal.

Figure 3:
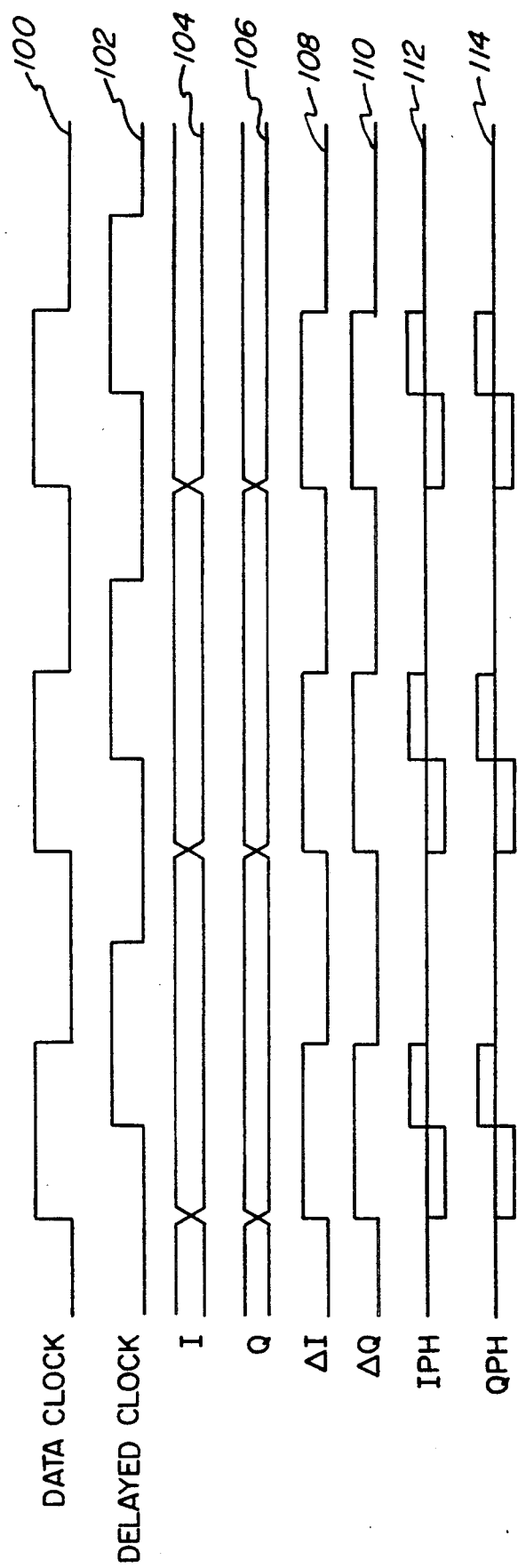
FIG. 3 is a timing diagram illustrating various signals produced by the data clock recovery circuit.

The I and Q components of a received QPSK signal are input at terminals 10 and 12, respectively. The I and Q components are recovered by any well known technique, such as a Costas loop detector. The I component input at terminal 10 is coupled to one input of an exclusive OR gate 16. The other input of exclusive OR gate 16 receives the I component after it has been delayed by one half bit by a conventional delay circuit 14. Any transitions of the I component will produce a pulse at the output of exclusive OR gate 16. Similarly, any transition in the Q component of the QPSK signal will produce a pulse at the output of exclusive OR gate 24 by virtue of the half bit delay introduced by delay circuit 22. This operation is illustrated in FIG. 3, where examples of I and Q data streams are illustrated at 104, 106 respectively. The resultant output pulses ΔI output from exclusive OR gate 16 are illustrated at 108, and output pulses ΔQ from exclusive OR gate 24 are illustrated at 110.

The signal pulses output from exclusive OR gate 16 are coupled to the enable input ("EN") of a tristate gate 18. Similarly, the signal pulses output from exclusive OR gate 24 are coupled to the EN input of tri-state gate 26. Both tri-state gates are enabled by their respective enable inputs to gate a delayed data clock signal coupled to the respective data inputs thereof.

Tri-state gates 18, 26 act as phase detectors, producing respective low/high waveforms IPH and QPH. The IPH waveform output from tri-state gate 18 is illustrated at 112 in FIG. 3. The QPH waveform output from tri-state gate 26 is illustrated at 114 in FIG. 3. The net DC value of each of the IPH and QPH waveforms is determined by the time relationship of the delayed clock input to the tristate gates and the respective ΔI and ΔQ signals.

As illustrated at summer 20, the IPH and QPH gated delayed clock signals are combined, and then low-pass filtered by circuitry 28 for amplification by amplifier 30 to provide an error signal that controls the output frequency of a voltage controlled oscillator 32 in a phase lock loop arrangement. When there are no data transmissions in the I and Q components of the QPSK signal, the loop is undisturbed since the tri-state gate outputs are open circuited.

VCO 32 outputs a data clock signal at terminal 48, which comprises a series of clock pulses 100 illustrated in FIG. 3. The data clock is delayed by one quarter bit in a conventional delay circuit 34, for input to the tri-state gates as described above. The relationship between the half bit delay provided to the I and Q components at the inputs of their respective OR gates 16, 24 by delay circuits 14, 22 and the delay introduced by delay circuit 34 ensures that the data clock will have a transition exactly in the center of the stable portions of the I and Q data inputs. In order to accomplish this, delay circuit 34 must introduce one half of the delay provided by delay circuits 14, 22. In this manner, the data clock is phase locked to the data in a manner that maximizes the detection of valid phase comparisons while minimizing the effects of periods where there are no data transitions in the incoming data. The delayed clock output from circuit 34 of FIG. 1 is illustrated at 102 in FIG. 3.

Once the properly phase locked data clock is provided as set forth above, the I and Q components of the QPSK signal can be sampled to recover data therefrom. In the illustrated embodiment, the data clock is inverted at inverter 36, and coupled to the clock inputs of D-type flip-flops 38, 40 to recover the I data and Q data, respectively.

Figure 2:
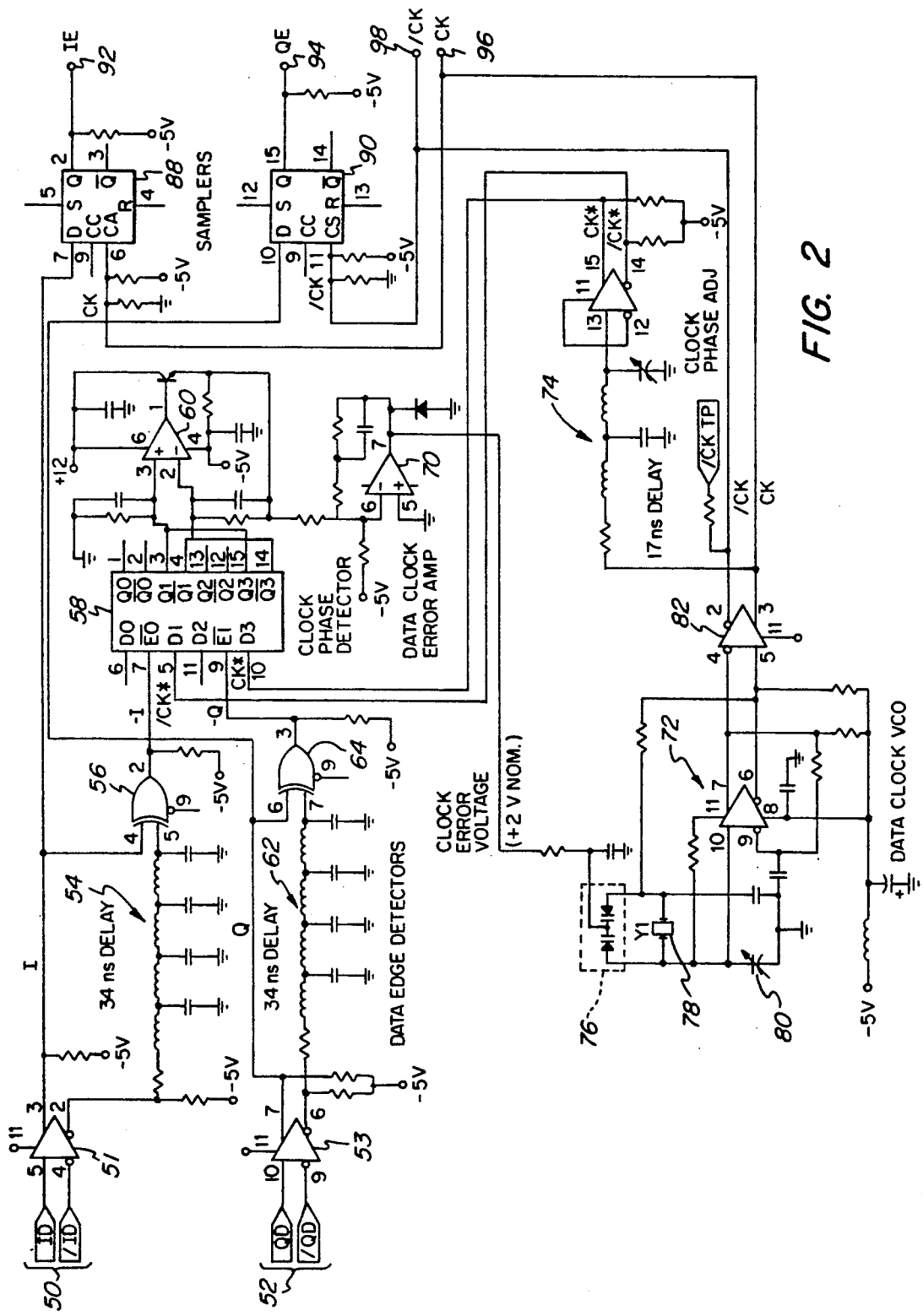
FIG. 2 is a detailed schematic diagram of the data clock recovery circuit.

A detailed schematic diagram of the circuit illustrated in FIG. 1 is provided in FIG. 2. As should be clear from the above description of FIG. 1, the circuit of FIG. 2 provides a stable clock which is used to sample the detected I and Q data in the middle of its stable time. This corresponds to the middle of the "eye" of the received data. The I data (ID,/ID) is input to a line receiver 51 and coupled directly to a first input of exclusive OR gate 56. A delay circuit generally designated 54 introduces a 34 nanosecond delay before the data is coupled to a second input of exclusive OR gate 56. Similarly, the Q data (QD,/QD) is input at terminals 52 to line receiver 53, and from there directly to one input of exclusive OR gate 64 and via 34 nanosecond delay 62 to a second input of exclusive OR gate 64. As a result, a pulse that is 34 nanoseconds long is generated on each transition of the data for both the I and Q signal phase components. These pulses are used to phase lock a crystal oscillator circuit generally designated 72 which provides the sampling clock for the I and Q data.

The pulses output from exclusive OR gates 56, 64 are input to a clock phase detector circuit comprising tri-state gates 58. A 17 nanosecond delay is provided by a delay line 74 to delay the clock signal output from line receiver 82 by one half the delay introduced by delay lines 54, 62. The delayed clock is applied, via line receiver 84, to the tri-state driver circuits 58, which gate the delayed clock to provide separate output enable control signals based on the signal pulses output from exclusive OR gates 56, 64. Thus, when there is a data edge from the I or Q detector, that portion of the delayed clock edge is gated through to the output of tri-state gates 58. The outputs are combined to provide a data clock error signal, and amplified by error amplifier 70 for input to the voltage controlled oscillator 72.

Circuit 60 is a low-pass differential amplifier that converts the differential output from the tristate gates 58 to a ground referenced single ended signal. Amplifier 70 is an integrating error amplifier that biases the varactor pair 76 to control the data clock VCO frequency. The frequency of crystal 78 is "pulled" by the capacitance of the varactor pair 76 and trimmer capacitor 80. Trimmer capacitor 80 is adjusted so that when data is being recovered from, the QPSK input, the nominal voltage output from error amplifier 70 is at a predefined value, e.g., +2 volts. This centers the VCO in its range.

Phase lock occurs at the point where the edge of the delayed clock is in the middle of the data edge pulse. At this point, the crystal oscillator and the detector I and Q data are in phase. Under these conditions, the differential outputs from the tri-state gates 58 have a zero DC component. As the relative phase varies from this point, the differential outputs from the tri-state gates have a positive or negative DC component.

Sampling of the I and Q data is provided by sampler circuits (D-type flip-flops) 88, 90, respectively. The flip-flops are used to re-clock the detected I and Q data with the data clock that has been phase locked to the data. The edge of the clock that is exactly in the middle of the stable time for the detector data is used by the flip-flops to output the stable I data "IE" on terminal 92 and the stable Q data "QE" on terminal 94. The data clock signal "CK" are inverted clock "/CK" are output at terminals 96, 98, respectively, for use by other portions of the data receiver.

It should now be appreciated that the present invention provides a method and apparatus for use in recovering data from stable center portions of multiphase modulated signal components. Although the invention is illustrated in connection with a QPSK transmission system, it will be appreciated that the invention can be used to recover data from any multiphase modulated signal having any number of phase components. This can be accomplished by expanding the circuits illustrated in FIGS. 1 and 2 to provide any necessary number of data input channels, each having its own transition pulse generator and tri-state gate. Other modifications and adaptations of the present invention will be apparent to those skilled in the art, without departing from the spirit and scope of the invention as set forth in the following claims.

What is claimed is:

1. A clock circuit for use in recovering data from stable center portions of multiphase modulated signal components comprising:
    means for generating a signal pulse upon the transition of a first phase component of a multiphase modulated signal transmitted at a fixed bit rate;
    oscillator means responsive to an error signal for generating a data clock signal having a frequency in synchronism with said bit rate;
    means for delaying said data clock signal by a fixed delay of approximately one half the duration of said signal pulse to provide a delayed clock;
    gate means having an enable input coupled to receive said signal pulse and a data input coupled to receive said delayed clock, for gating said delayed clock with said signal pulse to provide said error signal;
    means for coupling said error signal to said oscillator means to control the data clock frequency; and
    means responsive to said data clock for sampling components of said multiphase modulated signal to recover data therefrom.

2. A clock circuit in accordance with claim 1 wherein said generating means comprise:
    an exclusive OR gate;
    means for inputting said first phase component of said multiphase modulated signal to a first input of said exclusive OR gate;
    means for delaying said first phase component by a desired duration for said signal pulse; and
    means for inputting the delayed first phase component to a second input of said exclusive OR gate;
    wherein said exclusive OR gate outputs said signal pulse for said desired duration.

3. A clock circuit in accordance with claim 2 comprising:
    a plurality of exclusive OR gates, each having a first input coupled to receive a corresponding phase component of said multiphase modulated signal and a second input coupled to receive the corresponding phase component delayed by said desired duration;
    wherein said gate means are responsive to a plurality of signal pulses from said exclusive OR gates for outputting and summing a corresponding plurality of gated delayed clock signals to provide said error signal.

4. A clock circuit in accordance with claim 3 further comprising:
    low pass filter means coupled to an output of said gate means for filtering the summed plurality of gated delayed clock signals; and
    error amplifier means coupled to said low pass filter means for amplifying the filtered plurality of signals to provide said error signal.

5. A clock circuit in accordance with claim 1 wherein said gate means comprise a tri-state gate.

6. A clock circuit in accordance with claim 5 further comprising:
    low pass filter means for filtering a signal output from said tri-state gate; and
    error amplifier means for amplifying the filtered signal from said low pass filter means to provide said error signal.

7. A clock circuit in accordance with claim 1 wherein:
    the duration of said signal pulse is approximately one half of a bit time established by said fixed bit rate; and
    the fixed delay of said data clock is approximately one quarter of said bit time.

8. A method for recovering multiphase modulated data comprising the steps of:
    generating a signal pulse of a fixed duration upon the transition of a first phase component of a multiphase modulated signal transmitted at a fixed bit rate;
    generating a data clock signal frequency in synchronism with said bit rate in response to an error signal;
    delaying said data clock signal by a delay of approximately one half the duration of said signal pulse;
    gating said delayed clock using said signal pulse to provide said error signal; and
    sampling components of said multiphase signal using said data clock signal to recover data therefrom.

9. A method in accordance with claim 8 wherein said signal pulse generating step comprises the steps of:
    delaying a first phase component of said multiphase modulated signal by a time period equal to said fixed duration; and
    obtaining the exclusive OR of said first phase component and the delayed first phase component to provide said signal pulse.

10. A method in accordance with claim 9 comprising the steps of:
    providing a plurality of signal pulses from the exclusive ORs of a corresponding plurality of phase components and delayed phase components of said multiphase modulated signal;
    generating an error derivation signal corresponding to each signal pulse by gating said delayed clock in response to each signal pulse; and
    processing the error derivation signals to provide said error signal.

11. A method in accordance with claim 10 wherein said processing step comprises the steps of:
    summing, low pass filtering and amplifying said error derivation signals to provide said error signal.

12. A method in accordance with claim 8 wherein said fixed duration is approximately equal to one half of a bit time established by said fixed bit rate.

13. A QPSK data demodulator comprising:
    means for receiving a QPSK modulated data signal;
    means for inputting an I component of said QPSK signal to a first input of a first exclusive OR gate;
    means for delaying said I component by a first time period and inputting the delayed I component to a second input of said first exclusive OR gate;
    means for inputting a Q component of said QPSK signal to a first input of a second exclusive OR gate;
    means for delaying said Q component by said first time period and inputting the delayed Q component to a second input of said second exclusive OR gate;
    means for delaying a clock signal by a time period of approximately one half of said first time period to provide a delayed clock signal;

first gate means responsive to an output from said first exclusive OR gate for gating said delayed clock signal;

second gate means responsive to an output from said second exclusive OR gate for gating said delayed clock signal;

means coupled to said first and second gate means for processing the gated delayed clock signal to provide an error signal;

oscillator means responsive to said error signal for generating said clock signal; and means responsive to said clock signal for sampling said I and Q components to recover data carried thereby.

14. A demodulator in accordance with claim 13 wherein said first time period is equal to an amount by which said I and Q components are offset from each other.

15. A demodulator in accordance with claim 13 wherein said first and second gate means comprise tri-state gates.

16. A demodulator for use in recovering data from a plurality of phase components of a multiphase modulated signal comprising:

means for delaying a data clock signal produced by a voltage controlled oscillator to provide a delayed data clock signal;

means for detecting signal transitions in a plurality of phase components of said multiphase modulated signal and generating corresponding transition detect pulses;

means responsive to said transition detect pulses for gating said delayed data clock signal to produce a plurality of waveforms corresponding to said phase components, each waveform having an average value dependent on a time relationship between the delayed data clock signal and the duration of said transition detect pulses;

means for summing said waveforms to produce an error signal;

means responsive to said error signal for controlling the frequency of said voltage controlled oscillator; and means responsive to the data clock signal produced by said voltage controlled oscillator for sampling said phase components to recover data therefrom.

17. A demodulator in accordance with claim 16 wherein said data clock signal is delayed by approximately one half the duration of said transition detect pulses.

18. A demodulator in accordance with claim 17 wherein said sampling means sample said phase components in the center of successive data pulses carried thereby.

19. A demodulator in accordance with claim 16 wherein said gating means comprise a tri-state gate for each phase component, each tri-state gate having an enable input coupled to receive the transition detect pulses for the corresponding phase component and a data input coupled to receive said delayed data clock signal.

20. A demodulator in accordance with claim 19 wherein said data clock signal is delayed by approximately one half the duration of said transition detect pulses.

* * * * *